United States Patent Office 3,424,769
Patented Jan. 28, 1969

---

3,424,769
PROCESS FOR THE PREPARATION OF NOVEL 6α-METHYL-Δ⁴,⁹⁽¹⁰⁾-DIENE STEROIDS
John H. Fried, Palo Alto, Calif., assignor to Syntex Corporation, Panama, Panama, a corporation of Panama
No Drawing. Filed Apr. 4, 1966, Ser. No. 539,651
U.S. Cl. 260—397.4      12 Claims
Int. Cl. C07c *169/10, 169/08, 173/00*

ABSTRACT OF THE DISCLOSURE

Process for the preparation of 6α-methyl-Δ⁴,⁹⁽¹⁰⁾-diene steroids, having known uses as anabolic and progestational agents and containing optional substitution at C-17α and C-17β and optional additional unsaturation at C-11, 12, by treating the corresponding 5β,6β-methylene-Δ⁹⁽¹⁰⁾-ene steroids with acid.

---

This invention relates to a novel process for the preparation of steroids and to certain novel steroids thus produced.

More particularly, this invention relates to a process for the preparation of 6α-methyl-Δ⁴,⁹⁽¹⁰⁾-dienes. Further, this invention pertains to certain steroids possessing this system.

This novel process may be illustrated by the following partial formulas:

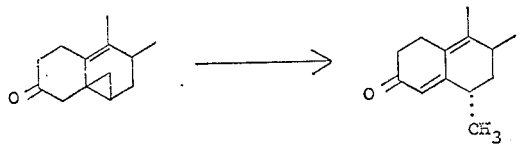

The novel steroids possessing this system and prepared hereby may be illustrated by the following formula:

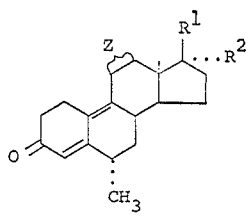

IV wherein R¹ represents hydroxy, tetrahydropyranyloxy, or a hydrocarbon carboxylic acyloxy group;
R² represents hydrogen, cyclopropyl, (lower)alkyl, (lower)alkenyl, (lower)alkynyl, halo(lower)alkynyl, or when taken together with R¹ an oxygen atom; and
Z represents a carbon-carbon single bond or a carbon-carbon double bond.

By the term "(lower)alkyl" and derivations thereof such as "halo(lower)alkynyl," is meant a monovalent, branched or straight chain hydrocarbon group of six or less carbon atoms. Representations of such (lower)alkyl groups are thus methyl, ethyl, propyl, butyl, pentyl, and hexyl; of such (lower)alkenyl groups are vinyl, propenyl, and the like; of such (lower)alkynyl groups are ethynyl, propynyl and the like; and of such halo(lower)alkynyl groups are chloroethynyl, chloropropynyl, and the like.

The hydrocarbon carboxylic acyloxy groups of this invention will contain less than twelve carbon atoms and may be of a straight, branched, cyclic or cyclic-aliphatic chain structure. They may be saturated, unsaturated, or aromatic and optionally substituted by functional groups such as hydroxy, nitro, amino, halogen, and the like. Typical esters thus include acetate, propionate, trimethylacetate, aminoacetate, haloacetate, benzoate, adamantoate, and the like.

These derivatives containing a 6α-methyl group and at least two sites of unsaturation between carbons 4 and 5 and carbons 9 and 10 of the steroid nucleus, exhibit anabolic activity and are accordingly effective in the treatment of debilatory conditions such as are encountered in old age, post-operative recuperation, and the like. Those compounds in which R² is alkynyl, particularly ethynyl, are progestational agents and are useful in the control and regulation of fertility.

In the practice of this invention, a 5β,6β-methylene-Δ⁹⁽¹⁰⁾-ene starting steroid is treated under acidic conditions such as is provided by mineral acids, for example, hydrochloric, hydrofluoric, sulfuric, perchloric, p-toluenesulfonic, and the like, and Lewis acids, for example, aluminum chloride, boron trifluoride, stannic chloride, zinc chloride, ferric chloride, and the like in solution with an inert, organic solvent, for example, benzene, ethanol, dioxane, methylene chloride, chloroform, tetrahydrofuran, and the like with or without the presence of water whereby the corresponding 6α-methyl-Δ⁴,⁹⁽¹⁰⁾-diene steroid is prepared. The product is recovered and purified via conventional procedures such as chromatography.

In accordance with the novel process hereof, acidic treatment of steroid generally is performed at or about room temperature (20° C. to 25° C.); however, with certain acids, such as hydrofluoric acid, lower temperatures (usually below 0° C.) are desirable. Different temperature choice is not adverse to the reaction. Reaction duration varies with the choice of acid and the temperature employed. One generally useful procedure is to allow the reaction mixture to stand at room temperature overnight or longer.

The desired orientation of the 6-methyl group with respect to the carbon to which it is bonded is generally alpha in the final product. Initially, however, the beta isomer is formed predominantly which isomerizes under the acid conditions to yield the alpha isomer. The beta isomer may be recovered or the reaction may be continued until the alpha species predominates.

The starting steroids for the instant process will possess the 5β,6β-methylene-Δ9(10)-ene system and may be prepared in accordance with the following reaction scheme:

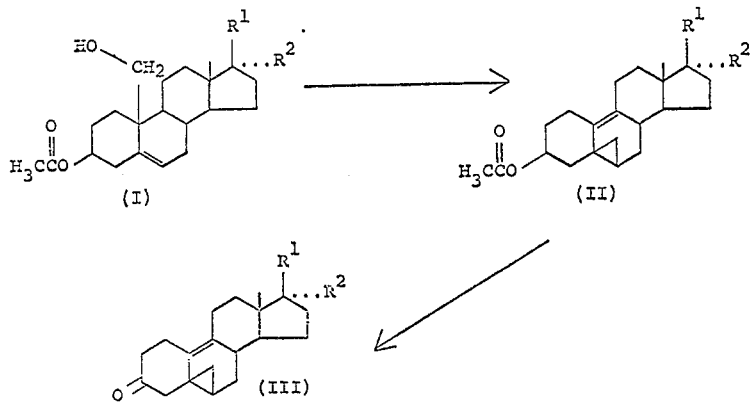

wherein R¹ and R² are as hereinbefore defined.

With reference to the foregoing scheme, those steroids represented by (I) are provided from the corresponding 5α-bromo-6β,19-oxides via ring opening with zinc dust in ethanol at reflux. Reaction of the 3-acetoxy-Δ⁵-19-ol steroids (I) with 1-diethylamino-1,1,2-trifluoro-2-chloroethane or other α-fluorinated amine affords the 3-acetoxy-5β,6β-methylene-Δ⁹-ene derivatives (II). Thereafter, alkaline hydrolysis of (II) gives the 3β-alcohol which is oxidized such as with chromic trioxide to give the corresponding ketone (III).

The process of this invention thereafter converts the 5β,6β-methylene-Δ9(10)-en-3-one (III) to the corresponding 6α-methyl-Δ4,9(10)-dien-3-one which provides one group of compounds represented by Formula IV above.

A third conjugated double bond between carbons 11 and 12 may be provided as follows:

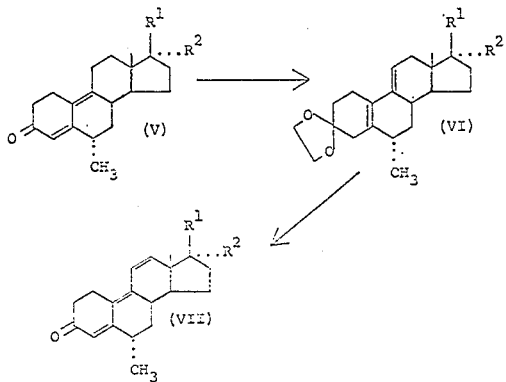

with each of R¹ and R² being as defined above. Thus, the Δ4,9(10)-diene (V) is treated with ethylene glycol in the presence of acid catalyst such as p-toluenesulfonic acid to give the corresponding ketal with rearranged unsaturation (VI). In those cases in which the starting steroid (V) contains a keto group at C-17 also, the diketal will be thus formed.

Thereafter, the ketal or diketal thus produced is epoxidized with a peroxy acid such as perbenzoic acid, m-chloroperbenzoic acid, and the like. The reaction product consists of a mixture of 5,10- and 9,11-epoxide derivatives. The epoxidation reaction mixture is treated with strong acid such as mineral acid, e.g., perchloric acid in organic solvent, e.g., dioxane, thus affording the final product (VII).

The processes of preparing the novel compounds of this invention (IV) characterized as Δ4,9(10)-dienes (V) or Δ4,9(10),11-trienes (VII) have been illustrated utilizing starting steroids containing C-17 groups defined by R¹ and R². These groups are preferably substituted as terminal procedures, and thus, in the foregoing reaction sequences R¹ is preferably acetoxy and R² is hydrogen, or R¹ and R² taken together is a keto group. In the first instance the acetoxy can be removed by base hydrolysis and the resultant hydroxyl group conventionally oxidized to the C-17 keto. After the novel processes disclosed herein have been conducted, the 17-keto may be reduced to give the corresponding 17α-unsubstituted-17β-ol system such as with sodium borohydride and the resultant hydroxyl esterified such as to the 17β-acetoxy group by treatment with acetic anhydride in pyridine. The 17β-tetrahydropyranyloxy group is provided by treatment of the hydroxyl with dihydropyran in the presence of acid catalyst.

The 17-keto group may also be treated with an organometallic such as alkyl lithium, alkenyl lithium, alkynyl lithium or alkyl magnesium halide, alkenyl magnesium halide, or alkynyl magnesium halide which provides the corresponding 17α-aliphatic-17β-ols. The 17α-alkyl or alkenyl groups such as ethyl or vinyl may be alternatively provided through controlled hydrogenation of the 17α-alkynyl group such as ethynyl. The 17α-vinyl may in turn be converted to 17α-cyclopropyl upon treatment with an iodomethyl metal iodide such as is provided by a combination of methylene iodide and zinc-copper couple. Thereafter, esterification of the tertiary hydroxyl group is done with the appropriate acylating agents. Etherification is performed as described above.

Before these elaboration processes are carried out, the 3-keto group, if present, is selectively protected such as by converting it to the 3-ketal by treatment with ethylene glycol in the presence of oxalic acid and benzene at reflux. Following molecular elaboration at C-17, the protecting group is removed in the usual manner such as by acid treatment.

The following examples serve to illustrate the manner by which this invention may be practiced but are not to be construed as limitations upon the scope hereof.

Example 1

A mixture of 1 g. of 3β-acetoxy-5α-bromo-6β,19-oxidoandrostan-17-one, 5 g. of zinc dust and 50 ml. of ethanol is heated at reflux for 16 hours and then filtered through Celite diatomaceous earth. The filtrate is evaporated to dryness to yield 3β-acetoxyandrost-5-en-19-ol-17-one which is recrystallized from acetone:hexane.

Example 2

A mixture of 5.54 g. of 3β-acetoxyandrost-5-en-19-ol-17-one, 4.56 g. of 1-diethylamino-1,1,2-trifluoro-2-chloroethane, and 100 ml. of dry acetonitrile is heated under reflux for one hour. The mixture is cooled to room temperature and passed through washed alumina eluting with 1.2 l. of hexane. Crystallization gives 3β-acetoxy-5β,6β-methyleneestr-9(10)-en-17-one which is recrystallized from methanol.

Example 3

A mixture of 1.0 g. of 3β-acetoxy-5β,6β-methyleneestr-9(10)-en-17-one in 2% methanolic potassium hydroxide (20 ml.) is warmed briefly on the steam bath to effect solution and kept overnight at room temperature. The product was isolated by dilution with cold water and filtration. Recrystallization from acetone afforded 5β,6β-methyleneestr-9(10)-en-3β-ol-17-one.

A solution of 6 g. of 5β, 6β-methyleneestr-9(10)-en-3β-ol-17-one in 120 ml. of pyridine is added to a mixture of 6 g. of chromic trioxide in 20 ml. of pyridine. The reaction mixture is allowed to stand at room temperature for 15 hours, diluted with ethyl acetate and filtered through Celite diatomaceous earth. The filtrate is washed well with water, dried and evaporated to dryness to yield 5β,6β-methyleneestr-9(10)-ene-3,17-dione which may be further purified by recrystallization from acetone:hexane.

The preceding examples may be practiced upon steroids containing other substituents at the C-17 position thus providing as a final product of Example 3 the corresponding 5β,6β-methylene-Δ$^{9(10)}$-en-3-ones. Thus, for example, the use of 3β,17β-diacetoxy-5α-bromo-6β,19-oxidoandrostane (prepared by reducing the 17-keto and acylating the resultant 17β-hydroxyl group) as the starting steroid in Example 1 results ultimately in the identical product in Example 3 after base hydrolysis and oxidation as described therein. Thereafter, these steroids may be treated as follows.

Example 4

An ice-cold solution of 0.9 g. of 5β,6β-methyleneestr-9(10)-ene-3,17-dione and 55 ml. of methylene chloride is added to a mixture of 5.4 g. of anhydrous hydrofluoric acid and 9 ml. of tetrahydrofuran previously cooled to −70° C. The resulting solution is stirred for 30 minutes at −70° C. and then left standing at −5° C. for 24 hours. The reaction mixture is poured into an excess of sodium bicarbonate solution and the organic phase extracted with methylene chloride. The organic oil is dissolved in methylene chloride and eluted with methylene chloride:ethyl acetate (1:1) through silica gel to give 6α-methylestra-4,9(10)-diene-3,17-dione.

Example 5

A solution of 1.0 g. of 5β,6β-methyleneestr-9(10)-ene-3,17-dione in 100 ml. of chloroform is treated with 37 ml. of a 30% aqueous perchloric acid. After 1 hour an aliquot of the reaction mixture is removed. The remainder is left for 5 additional hours. Both samples are then poured into a saturated sodium chloride solution. The product is then isolated from each by extraction with ethyl acetate and, after recrystallization from acetone:ether, there is obtained 6β-methylestra-4,9(10)-diene-3,17-dione from the aliquot sample and 6α-methylestra-4,9(10)-diene-3,17-dione from the other reaction sample.

Example 6

The procedure of Example 5 is repeated except that the following combinations are substituted for the acidic conditions recited therein:

2 ml. of borontrifluoride-etherate in 50 ml. of tetrahydrofuran 2 ml. of borontrifluoride-etherate and 5 ml. of concentrated hydrochloric acid in 50 ml. of tetrahydrofuran 40 ml. of 30% aqueous sulfuric acid in 113 ml. of dioxane 10 ml. of acetic acid and 24 ml. of 16% aqueous sulfuric acid in 75 ml. of dioxane 8 g. of p-toluenesulfonic acid monohydrate in 90 ml. of benzene.

In each case, similar results are obtained.

The procedures set forth in Examples 4 through 6 may be used to provide the other products contemplated herein from the corresponding starting steroids.

A third conjugated double bond is provided according to the following example using representative compounds.

Example 7

A mixture of 1 g. of 6α-methylestra-4,9(10)-diene-3,17-dione, 25 ml. of dry benzene, 5 ml. of ethylene glycol and 50 mg. of p-toluenesulfonic acid monohydrate is refluxed for 16 hours using a water separator. The reaction mixture is then washed with aqueous sodium bicarbonate solution and water, dried and evaporated to dryness to yield 3,3;17,17 - bisethylenedioxy - 6α-methylestra-5(10), 9(11)-diene which is recrystallized from acetone:hexane.

To a solution of 1.75 g. of 3,3;17,17-bisethylenedioxy-6α-methylestra-5(10),9(11)-diene in 5 ml. of methylene chloride is added 1.2 g. of m-chloroperbenzoic acid. The reaction mixture is kept at room temperature for 20 minutes. The mixture is then extracted with methylene chloride, the extracts washed with dilute sodium bicarbonate solution and water, and evaporated to yield an oil.

The oil thus obtained is chromatographed on silica with 1:1 ethyl acetate:hexane and is then dissolved in 4 ml. of dioxane and treated at 25° C. with 0.05 ml. of perchloric acid (70%) for 20 minutes. Isolated via chromatography yields 6α-methylestra-4,9(10),11-triene-3,17-dione.

The foregoing procedures may be performed upon the corresponding 6β-methyl steroids with similar results. Likewise, the other trienes contemplated herein are provided from the corresponding diene starting steroids.

In lieu of performing the foregoing procedures on starting steroids already containing certain C-17 substituents as defined hereinbefore, these substituents may be provided as follows.

Example 8

A mixture of 2 g. of 6α-methylestra-4,9(10)-diene-3,17-dione, 150 ml. of dry benzene, 18 ml. of ethylene glycol, and 40 mg. of oxalic acid monohydrate is refluxed for 18 hours under a nitrogen atmosphere. The reaction mixture is then washed with aqueous sodium bicarbonate solution and water, dried and evaporated to dryness to yield 3,3-ethylenedioxy-6α-methylestra-4,9(10)-dien-17-one which is recrystallized from acetone:hexane.

Similarly, 3,3-ethylenedioxy-6α-methylestra-4,9(10),11-trien-17-one is prepared.

Example 9

A solution of 5 g. of 3,3-ethylenedioxy-6α-methylestra-4,9(10)-dien-17-one in 250 ml. of thiophene-free benzene is treated with an equimolar amount of methylmagnesium bromide in anhydrous ether. The mixture is heated at reflux under anhydrous conditions for 3 hours, cooled, and cautiously treated with excess aqueous ammonium chloride solution. This mixture is then extracted with ethyl acetate and these extracts are in turn washed with water, dried over sodium sulfate and evaporated to dryness to yield 3,3-ethylenedioxy-6α,17α-dimethylestra-4,9(10)-dien-17β-ol which is recrystallized from methylene chloride:hexane.

A mixture of 0.5 g. of 3,3-ethylenedioxy-6α,17α-dimethylestra-4,9(10)-dien-17β-ol in 25 ml. of acetone and 0.1 ml. of concentrated hydrochloric acid is allowed to stand at room temperature for 15 hours and is then poured into water. This mixture is extracted with methylene chloride and the extracts are in turn washed with water to neutrality, dried over sodium sulfate, and evaporated to dryness, to yield 6α,17α-dimethylestra-4,9(10)-dien-17β-ol-3-one which may be recrystallized from acetone:hexane. Similarly, 6α,17α-dimethylestra-4,9(10),11-trien-17β-ol-3-one is prepared.

Example 10

To a stirred solution of 2 g. of 3,3-ethylenedioxy-6α-methylestra-4,9(10)-dien-17-one in 250 ml. of absolute ether is added in a dropwise fashion and under nitrogen, an ethereal solution of 10 molar equivalents of ethyl lithium. The mixture is then stirred for 48 hours at room temperature, poured into water, acidified with hydrochloric acid, and stirred vigorously for 1 hour. The ethereal phase is separated, washed with water to neutrality, dried over sodium sulfate, and evaporated to dryness to yield 3,3-ethylenedioxy - 6α - methyl - 17α-ethylestra-4,9(10)-dien-17β-ol which is further purified through recrystallization from acetone:hexane.

Hydrolysis with acid according to the procedure set forth in the second paragraph of Example 9 affords 6α-methyl-17α-ethylestra-4,9(10)-dien-17β-ol-3-one.

Similarly, 6α - methyl - 17α-ethylestra-4,9(10),11-trien-17β-ol-3-one is prepared.

Example 11

A solution of 8.5 g. of 1,2-dichloroethylene in 50 ml. of anhydrous ether is added in a dropwise fashion, under nitrogen and at 0° C., over a 30 minute period to a stirred solution of 15 ml. of 1.4 N methyl lithium in anhydrous ether. After stirring for an additional 90 minutes at room temperature, a solution of 0.5 g. of 3,3-ethylenedioxy-6α-methylestra-4,9(10)-dien-17-one in 20 ml. of anhydrous ether is added in a dropwise fashion with stirring over a 15-minute period. Stirring at room temperature is continued for 18 hours, and the reaction mixture is then poured into ice water, dried over sodium sulfate, and concentrated under reduced pressure. The residue is chromatographed on alkaline alumina with 8:2 hexane:ether to yield 3,3-ethylenedioxy-6α-methyl-17α-chloroethynylestra-4,9(10)-dien-17β-ol which may be recrystallized from methanol.

Hydrolysis with acid according to the procedure of the second paragraph of Example 9 yields 6α-methyl-17α-chloroethynylestra-4,9(10)-dien-17β-ol-3-one.

Likewise, 6α - methyl - 17α-chloroethynylestra-4,9(10),11-trien-17β-ol-3-one is prepared.

Example 12

A solution of 1 g. of 3,3-ethylenedioxy-6α-methylestra-4,9(10)-dien-17-one in 30 ml. of anhydrous benzene is added under nitrogen to a solution of 1.4 g. of potassium in 30 ml. of t-amyl alcohol, previously saturated with acetylene. A slow current of purified acetylene is continually passed through the solution for 40 hours. The mixture is diluted with water and extracted with benzene. These extracts are washed with water to neutrality, dried over sodium sulfate, and evaporated. Chromatography of the residue on alkaline alumina with 2:3 hexane:benzene yields 3,3 - ethylenedioxy - 6α-methyl-17α-ethynylestra-4,9(10)-dien-17β-ol which is recrystallized from acetone:hexane.

Acid hydrolysis by the procedure of the second paragraph of Example 9 yields 6α-methyl-17α-ethynylestra-4,9(10)-dien-17β-ol-3-one.

Likewise prepared is 6α-methyl-17α-ethynylestra-4,9(10),11-trien-17β-ol-3-one.

Example 13

A mixture of 1 g. of 6α-methyl-17α-ethynylestra-4,9(10)-dien-17β-ol-3-one, 1 g. of p-toluenesulfonic acid monohydrate, 50 ml. of acetic acid and 25 ml. of acetic anhydride is allowed to stand at room temperature for 24 hours, and then poured into water and stirred. This mixture is then extracted with methylene chloride and these extracts are dried and evaporated to yield 6α-methyl-17α-ethynyl-17β-acetoxyestra-4,9(10)-dien-3-one which is recrystallized from acetone:ether.

Likewise, 6α - methyl-17α-ethynyl-17β-acetoxyestra-4,9(10),11-trien-3-one is prepared as well as the 17β-acetates of the other 17α-aliphatic-17β-ols hereof.

Example 14

A mixture of 2 g. of 6α-methylestra-4,9(10),11-trien-17β-ol-3-one in 8 ml. of pyridine and 4 ml. of adamantoyl chloride is heated at steam bath temperatures for one hour. The mixture is then poured into ice water and the solid which forms is collected by filtration, washed with water and dried to yield 6α-methyl-17β-adamantoyloxyestra-4,9(10),11-trien-3-one which is further purified through recrystallization from methylene chloride:hexane. Similarly, 6α - methyl-17β-adamantoyloxyestra-4,9(10)-dien-3-one is prepared. Thus also prepared are the 17β-adamantoyloxy derivatives of the 17α-aliphatic-17β-ols of this invention including among others, 6α,17α-dimethyl-17β-adamantoyloxyestra-4,9(10)-dien-3-one.

Example 15

Two milliliters of dihydropyran are added to a solution of 1 g. of 6α-methyl-17α-ethynylestra-4,9(10)-dien-17β-ol-3-one in 15 ml. of benzene. About 1 ml. is removed by distillation to remove moisture and 0.4 g. of p-toluenesulfonic acid is added to the cooled solution. This mixture is allowed to stand at room temperature for 4 days and is then washed with aqueous sodium carbonate solution and water, dried and evaporated. The residue is chromatographed on neutral alumina, eluting with hexane, to yield 6α - methyl-17α-ethynyl-17β-tetrahydropyranyloxyestra-4,9(10)-dien-3-one which is recrystallized from pentane.

Likewise prepared are the other 17α - aliphatic - 17β-tetrahydropyranyl ethers hereof. Similarly, 6α - methyl-17β-tetrahydropyranyloxyestra-4,9(10)-dien-3-one is prepared from 6α-methylestra-4,9(10)-dien-17β-ol-3-one.

Example 16

A solution of 1 g. of 6α-methyl-17α-ethynylestra-4,9(10)-dien-17β-ol-3-one in 40 ml. of pyridine is hydrogenated at 25° C. atmospheric pressure in the presence of 0.4 g. of prehydrogenated 2% palladium-on-calcium carbonate. When 1.1 molar equivalents of hydrogen are absorbed the reaction is stopped. The catalyst is removed by filtration through Celite diatomaceous earth and washed with ethyl acetate and the combined filtrate and washings are evaporated to dryness under reduced pressure. The residue is dissolved in ethyl acetate and this solution is then washed with dilute hydrochloric acid and water to neutrality, dried and evaporated to dryness to yield 6α-methyl-17α-vinylestra-4,9(10)-dien-17β-ol-3-one which is further purified through recrystallization from acetone.

Similarly, 6α - methyl-17α-vinylestra-4,9(10),11 - trien-17β-ol-3-one is prepared.

Example 17

A solution of 3 g. of 6α-methyl-17α-ethynylestra-4,9(10)-dien-17β-ol-3-one is 125 ml. of dioxane is hydrogenated at 25° C./570 mm. with 0.5 g. of pre-hydrogenated 10% palladium-on-charcoal. Upon the consumption of the theoretical amount of hydrogen, the solution is filtered and the filtrate evaporated to dryness under reduced pressure to yield 6α-methyl-17α-ethylestra - 4,9(10)-dien-17β-ol-3-one which is recrystallized from acetone.

Likewise prepared is 6α-methyl-17α-ethylestra-4,9(10),11-trien-17β-ol-3-one.

Example 18

A mixture of 7 g. of methylene iodide and 3 g. of zinc-copper in 15 ml. of anhydrous ether is heated at reflux under nitrogen for 3 hours. The mixture is then cooled and 2 g. of 6α-methyl-17α-vinylestra-4,9(10)-dien-17β-ol-3-one are added. This mixture is allowed to stand at room temperature for 2 hours and is then poured into 200 ml. of 2% aqueous sodium carbonate and extracted twice with 100 ml. portions of ether. These extracts are dried over sodium sulfate and evaporated under reduced pressure. The residue is held at 0.01 mm. to remove any unreacted methylene iodide and then recrystallized from hexane to yield 6α-methyl-17α-cyclopropylestra-4,9(10)-dien-17β-ol-3-one.

Similarly prepared is 6α-methyl-17α-cyclopropylestra-4,9(10),11-trien-17β-ol-3-one.

Example 19

A solution of 1 g. of sodium borohydride in 3 ml. of water is added to an ice-cooled solution of 1 g. of 3,3-ethylenedioxy-6α-methylestra-4,9(10)-dien-17-one in 120 ml. of methanol and the mixture then allowed to stand for 16 hours at room temperature. The excess reagent is decomposed by addition of acetic acid and the solution is then concentrated to small volume in vacuo and diluted with water. The product is extracted with ethyl acetate and these extracts are washed with water, dried and evaporated to yield 3,3-ethylenedioxy-6α-methylestra-4,9(10)-dien-17β-ol which may be further purified by recrystallization from acetone:hexane.

Similarly, 3,3-ethylenedioxy-6α-methylestra-4,9(10),11-trien-17β-ol is prepared.

Acid hydrolysis of these two products by the procedure given in Example 9 (second paragraph) affords 6α-methylestra-4,9(10)-dien-17β-ol-3-one and 6α-methylestra-4,9(10),11-trien-17β-ol-3-one.

The 17α-unsubstitued - 17β - ols prepared as described herein are treated according to the procedure of Example 14, thus giving 6α-methyl - 17β - adamantoyloxyestra-4,9(10)-dien-3-one and 6α-methyl-17β-adamantoyloxyestra-4,9(10),11 - trien - 3 - one. Similar treatment as that described in Example 15 gives 6α-methyl - 17β - tetrahydropyranyloxyestra-4,9(10)-dien-3-one and 6α-methyl - 17β-tetrahydropyranyloxyestra-4,9(10),11-trien-3-one.

The secondary acyloxy group is provided as follows:

A mixture of 1 g. of 6α-methylestra-4,9(10)-dien-17β-ol-3-one, 4 ml. of pyridine and 2 ml. of acetic anhydride is allowed to stand at room temperature for 15 hours. The mixture is then poured into ice water and the solid which forms is collected by filtration, washed with water and dried to yield 6α-methyl-17β-acetoxyestra - 4,9(10)-dien-3-one which may be further purified through recrystallization from acetone:hexane.

Similarly prepared is 6α-methyl-17β-acetoxyestra - 4,9(10),11-trien-3-one from 6α-methylestra-4,9(10)11-trien-17β-ol-3-one.

The procedures set forth in Examples 8 through 19 may also be performed on the corresponding 6β-methyl dienes and trienes or initially before the process of this patent is practiced thereon. Thus, for example, 5β,6β-methylene-estra-9(10)-ene-3,17-dione may be thereby treated to give 5β,6β-methyleneestra-9(10)-en-3-ones appropriately substituted in the C-17 position.

What is claimed is:

1. A process fo preparing a 6α-methyl-Δ$^{4,9(10)}$-diene steroid which comprises treating a 5β,6β-methylene-Δ$^{9(10)}$-ene steroid with an acid selected from the group consisting of a mineral acid and Lewis acid.

2. The process of claim 1 wherein said acid is a mineral acid.

3. The process of claim 1 wherein said acid is a Lewis acid.

4. The process of claim 1 wherein the starting steroid is a 5β,6β-methylene-19-norandrost-9(10)-ene thereby providing a 6α-methyl-19-norandrosta-4,9(10)-diene.

5. The process of claim 1 whereby to produce a 6α-methyl-Δ$^{4,9(10)}$-diene steroid of the formula:

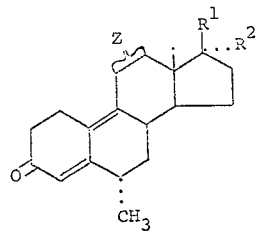

wherein $R^1$ is hydroxy, tetrahydropyranyloxy, or a hydrocarbon carboxylic acyloxy group of less than 12 carbon atoms;

$R^2$ is hydrogen, cyclopropyl, (lower)alkyl, (lower)-alkenyl, (lower)alkynyl, halo(lower)alkynyl, or when taken together with $R^1$, an oxygen atom; and Z is a carbon-carbon single bond or a carbon-carbon double bond.

6. The process of claim 5 wherein $R^1$ is acetoxy, $R^2$ is hydrogen, and Z is as therein defined.

7. The process of claim 5 wherein $R^1$ is hydroxy, $R^2$ is methyl, and Z is as therein defined.

8. The process of claim 5 wherein $R^1$ is hydroxy, $R^2$ is ethyl, and Z is as therein defined.

9. The process of claim 5 wherein $R^1$ is hydroxy, $R^2$ is vinyl, and Z is as therein defined.

10. The process of claim 5 wherein $R^1$ is hydroxy, $R^2$ is cyclopropyl, and Z is as therein defined.

11. The process of claim 5 wherein $R^1$ is hydroxy, $R^2$ is ethynyl, and Z is as therein defined.

12. The process of claim 5 wherein $R^1$ is acetoxy, $R^2$ is ethynyl, and Z is as therein defined.

References Cited

UNITED STATES PATENTS

| | | | |
|---|---|---|---|
| 3,047,592 | 7/1962 | Schonemann et al. | 260—397.4 |
| 3,086,027 | 4/1963 | Perelman et al. | 260—397.3 |
| 3,139,426 | 6/1964 | Cross | 260—239.55 |
| 3,239,512 | 3/1966 | Cross | 260—239.55 |
| 3,248,294 | 4/1966 | Nomine et al. | 167—74 |
| 3,257,278 | 6/1966 | Nomine et al. | 167—74 |

OTHER REFERENCES

Fried et al., J. Amer. Chem. Soc. 83, pp. 4663 and 4664 (1961).

Rapala et al., Amer. Chem. Soc. Abstr., 148th Meet., 1964, p. 22P.

Roussel-UCLAF, S.A., Chem. Abstr. 60, 3039h (1964).

Velluz et al., Chem. Abstr. 59, 12859d (1963).

LEWIS GOTTS, Primary Examiner.

ETHEL G. LOVE, Assistant Examiner.

U.S. Cl. X.R.

260—239.55, 397.3 397.45, 397.5, 999